(No Model.)
E. JAVAUX & C. F. GALLOIS.
PROCESS OF REFINING SUGAR BY ELECTROLYSIS.
No. 543,249. Patented July 23, 1895.
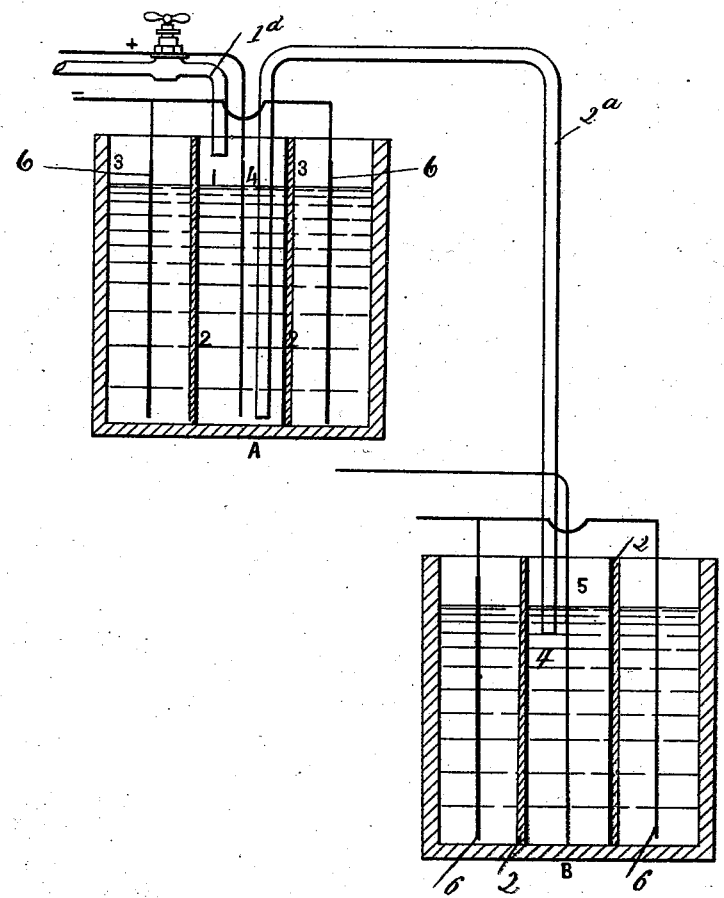
Witnesses
G. W. Rea,
Thos. A. Green
Inventors
Emile Javaux and
Charles F. Gallois.
By James L. Norris
Atty.

UNITED STATES PATENT OFFICE.

EMILE JAVAUX AND CHARLES FRANÇOIS GALLOIS, OF PARIS, FRANCE.

PROCESS OF REFINING SUGAR BY ELECTROLYSIS.

SPECIFICATION forming part of Letters Patent No. 543,249, dated July 23, 1895.

Application filed May 26, 1894. Serial No. 512,536. (No specimens.) Patented in France January 16, 1894, No. 235,542; in Belgium January 19, 1894, No. 108,138; in Austria January 24, 1894, No. 44/1,877; in Spain January 24, 1894, No. 15,403, and in Germany January 25, 1894.

*To all whom it may concern:*

Be it known that we, EMILE JAVAUX and CHARLES FRANÇOIS GALLOIS, citizens of France, and residents of Paris, in the Department of the Seine, France, have invented a new and useful Improvement in the Process of Refining Sugar by Electricity, (for which we have obtained Letters Patent in France January 16, 1894, No. 235,542; in Belgium January 19, 1894, No. 108,038; in Austria January 24, 1894, No. 44/1,877; in Spain January 24, 1894, No. 15,403, and in Germany January 25, 1894,) of which the following is a specification.

The object of this invention is to purify sacchariferous liquids or juices extracted by diffusion, pressure, or otherwise from beetroot, sugar-cane, sorgho, &c., in such a manner that all the sugar contained in such liquids may be extracted from them direct in one operation in the condition of white refined sugar, so that carbonating and the formation of residual products and molasses are avoided.

The main novel features of the process constituting our invention consist in the following operations: Lime or baryta being added to the juice, it is heated to from 85° to 90° centigrade for the purpose of neutralizing its natural acidity, a slight alkaline reaction being allowed to take place in the liquid, so that any partial inversion of the sugar may be avoided and a large portion of the organic matters or impurities contained in the juice precipitated at the very outset. After being filtered or strained the juice is subjected to the action of an electrical current in two series of electrolyzing troughs or basins. The liquids under treatment are conveyed into compartments separated by porous partitions from other compartments containing water. The anodes immersed into the sacchariferous liquids are formed by plates of lead, into which the liquids are made to pass on leaving the troughs of the first series. The cathodes of the negative compartments, which are filled with water, may be made of carbon, iron, or any other substance, being a good conductor of electricity and insoluble in alkalies. Under the action of the electrical current the organic impurities are decomposed, the acids which are set free are fixed upon the soluble anode, with which they combine, while at the same time the corresponding basic elements are discharged into the water-compartments by being caused to pass through the porous partitions.

Where electrodes of lead are used at the very beginning of the electrolytic operation, a certain inconvenience may in the case of some liquids or juices be experienced owing to the formation of small quantities of soluble lead salts which would impair the purity of the liquids and which it is therefore imperative to eliminate in a subsequent operation if it be desired to obtain a perfectly-pure product. We succeed in avoiding this inconvenience by dividing the action of the electrolyte into fractions, as it were, in the manner stated above.

The invention will be best understood by a reference to the accompanying drawings, in which we have shown diagrams of two electrolytic basins which do not in themselves form subjects of our invention, but which we have deemed it necessary to represent, the better to illustrate the manner in which our improved process should be carried into effect.

After having been treated, as above specified, with lime or baryta, for the purpose of being freed from their original impurities, (a very important operation, inasmuch as, owing to the presence of the lime or baryta in the juice under treatment, any subsequent formation of soluble salts of lead is obviated,) the juice is conveyed into the central compartment 1 of a basin A by an inlet-pipe 1ª. This compartment 1 is separated from the two adjacent compartments 3 by two partitions 2, which may be made of porcelain or any other porous material. The compartments 3 are filled with water. An anode 4, made of lead, dips into the center portion of the compartment 1, and the cathodes 6, made of carbon, iron, or other suitable substance, into the two contiguous compartments.

The liquids are conveyed from the compartments 1 in tank A to the compartments 5 in tank B by a pipe 2ª.

We have here assumed that one basin or trough only is used in each stage with a view to simplifying the illustration; but it will be understood that the number of basins may be multiplied in each series of operations when it is desired to treat large quantities of sugar-juice at the same time. It will also be understood that the liquids may be kept in motion continuously. To do so it is only necessary to place the basins B on a lower plane or level than that on which the basins A are erected, so that the liquids may of their own accord pass on from the compartments 1 into the compartments 5 after having undergone an initial or partial electrolytic action, the speed of motion of the liquids being suitably controlled and determined in accordance with the time necessary for the completion of the electrolytic operations. When such operations are completed, the juice is extracted from the second series of electrolytic troughs or basins and then decanted or filtered, and thereby freed from any deposit of organic matters rendered insoluble and of precipitated salts of lead that may have formed in them.

Should the anodes have allowed any of the acids, which in combining with lead form soluble salts, to escape, or, in other words, should the decanted liquids be still found to contain traces of lead, this latter impurity may be eliminated by phosphoric acid. For this purpose there is added to the liquid a quantity of liquid diluted phosphoric acid sufficient to bring about a slightly-acid reaction. The phosphate of lead is precipitated, and any phosphoric acid there may be in excess is eliminated by the addition of a small quantity of lime. After being filtered the sacchariferous liquids are concentrated in the usual manner by means of evaporating apparatus and are further treated by the methods commonly adopted in the sugar manufacture.

Heretofore a process has been proposed for the treatment of "sweet water," which consists in electrolysis, the current being introduced through an anode of aluminium, sufficient lime having been added to render the solution distinctly alkaline. The excess of alkalinity is said to be beneficial, as most of the lime combines with the aluminium to form an insoluble compound, thus facilitating the elimination of the iron. We make no claim in this application to such a process.

Having now particularly described and ascertained the nature of our said invention and in what manner the same is to be performed, we declare that what we claim is—

The process described for the purification of sugar-juices, which consists in adding lime in excess, to neutralize the acid constituents, precipitate the organic impurities, and prevent the formation of salts of lead, then treating the alkaline juice by an electric current introduced from anodes of lead in two separate tanks simultaneously, and drawing said juice from one tank into the other, during said treatment, substantially as described.

In testimony whereof we have signed this specification in the presence of two subscribing witnesses.

EMILE JAVAUX.
CHARLES FRANÇOIS GALLOIS.

Witnesses:
CLYDE SHROPSHIRE,
J. O. FREY.